US011436623B2

United States Patent
Kappagantu et al.

(10) Patent No.: US 11,436,623 B2
(45) Date of Patent: Sep. 6, 2022

(54) SYSTEMS AND METHODS FOR REWARD ACCOUNT PROCESSING USING A DISTRIBUTED LEDGER

(71) Applicant: JPMORGAN CHASE BANK, N.A., New York, NY (US)

(72) Inventors: Ravi Kappagantu, Hyderabad (IN); Srinivasulu Kummari, Hyderabad (IN); Md Sarfaraz Asad Khan, Orissa (IN); Olutayo Ibikunle, Upper Montlair, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 84 days.

(21) Appl. No.: 16/415,155

(22) Filed: May 17, 2019

(65) Prior Publication Data

US 2019/0355005 A1    Nov. 21, 2019

Related U.S. Application Data

(60) Provisional application No. 62/672,634, filed on May 17, 2018.

(51) Int. Cl.
G06Q 30/02     (2012.01)
H04L 9/32      (2006.01)

(52) U.S. Cl.
CPC ..... G06Q 30/0215 (2013.01); G06Q 30/0233 (2013.01); H04L 9/3236 (2013.01); H04L 2209/38 (2013.01); H04L 2209/56 (2013.01)

(58) Field of Classification Search
CPC .......... G06Q 30/0215; G06Q 30/0233; G06Q 30/02; H04L 9/3236; H04L 2209/38; H04L 2209/56
See application file for complete search history.

(56) References Cited

U.S. PATENT DOCUMENTS 8,408,455 B1 *  4/2013  Taylor ................. G06Q 20/10
                                                  235/379
8,423,401 B2 *  4/2013  Antonucci ......... G06Q 30/0253
                                                  705/14.65
(Continued)

FOREIGN PATENT DOCUMENTS

WO    2017136956    8/2017

OTHER PUBLICATIONS

International Search Report, dated Jul. 24, 2019, from corresponding International Application No. PCT/US2019/032915.

(Continued)

Primary Examiner — Thuy N Nguyen
(74) Attorney, Agent, or Firm — Greenberg Traurig LLP

(57) ABSTRACT

Systems and methods for reward account processing using a distributed ledger are disclosed. According one embodiment, at a node in a distributed ledger network for a plurality of reward program participants, the node comprising at least one computer processor, a method for reward account processing using a distributed ledger may include: (1) receiving a request to withdraw an amount of reward points from a customer account for a customer maintained by a distributed ledger; (2) retrieving, from the distributed ledger, a reward points balance for the customer account; (3) verifying that the reward points balance in the customer account is greater than the amount of reward points to be withdrawn; (4) writing a deduction of the amount of reward points from the reward points balance in the customer account to the distributed ledger; and (5) causing a financial instrument to be issued in response to the deduction.

19 Claims, 3 Drawing Sheets

(56) References Cited

U.S. PATENT DOCUMENTS

| | | | |
|---|---|---|---|
| 2002/0111859 A1* | 8/2002 | Sheldon | G06Q 30/0207 705/14.15 |
| 2003/0236712 A1* | 12/2003 | Antonucci | G06Q 30/02 705/14.3 |
| 2006/0052153 A1* | 3/2006 | Vlazny | G07F 17/32 463/17 |
| 2008/0040261 A1* | 2/2008 | Nix | G06Q 20/06 705/39 |
| 2009/0012862 A1* | 1/2009 | Pirillo | G06Q 30/02 705/14.27 |
| 2010/0057553 A1* | 3/2010 | Ameiss | G06Q 20/387 705/14.32 |
| 2010/0299251 A1* | 11/2010 | Thomas | G06Q 40/02 705/39 |
| 2010/0299260 A1* | 11/2010 | Thomas | G06Q 20/102 705/44 |
| 2011/0270664 A1* | 11/2011 | Jones | G06Q 30/02 705/14.33 |
| 2011/0270665 A1* | 11/2011 | Kim | G06Q 30/0233 705/14.33 |
| 2012/0215608 A1* | 8/2012 | Paulos | G06Q 30/02 705/14.23 |
| 2013/0073459 A1* | 3/2013 | Zacarias | G06Q 20/36 705/41 |
| 2014/0136309 A1* | 5/2014 | Goldman | G06Q 30/0226 705/14.27 |
| 2015/0170188 A1* | 6/2015 | Santaella | G06Q 30/0229 705/14.3 |
| 2015/0254698 A1* | 9/2015 | Bondesen | G06Q 20/36 705/14.17 |
| 2016/0042383 A1* | 2/2016 | Joshi | G06Q 30/0237 705/14.16 |
| 2017/0124556 A1* | 5/2017 | Seger, II | H04L 69/40 |
| 2017/0140408 A1* | 5/2017 | Wuehler | G06Q 30/0207 |
| 2017/0154350 A1* | 6/2017 | Perlee | G06Q 30/0212 |
| 2017/0330181 A1* | 11/2017 | Ortiz | G06Q 20/3223 |
| 2018/0150844 A1* | 5/2018 | Dolan | G06Q 20/40145 |
| 2018/0268401 A1* | 9/2018 | Ortiz | G06Q 20/204 |
| 2018/0285916 A1* | 10/2018 | Althauser | G06Q 20/3223 |
| 2018/0300705 A1* | 10/2018 | Link | G06Q 20/24 |
| 2019/0073666 A1* | 3/2019 | Ortiz | G06Q 30/0207 |
| 2019/0081789 A1* | 3/2019 | Madisetti | H04L 9/3213 |
| 2019/0188411 A1* | 6/2019 | Kroutik | H04L 9/3297 |
| 2020/0226630 A1* | 7/2020 | Balfour | G06Q 20/387 |

OTHER PUBLICATIONS

Written Opinion of the International Searching Authority, dated Jul. 24, 2019, from corresponding International Application No. PCT/US2019/032915.

* cited by examiner

SYSTEMS AND METHODS FOR REWARD ACCOUNT PROCESSING USING A DISTRIBUTED LEDGER

RELATED APPLICATIONS

This application claims priority to, and the benefit of, U.S. Provisional Patent Application Ser. No. 62/672,634, filed May 17, 2018, the disclosure of which is hereby incorporated, by reference, in its entirety.

BACKGROUND OF THE INVENTION

1. Field of the Invention

The present disclosure generally relates to systems and methods for reward account processing using a distributed ledger.

2. Description of the Related Art

Merchants and vendors that participate in loyalty or rewards programs generally do not exchange information in real-time. Vendor onboarding can take between three and five months. In addition, order redemption and fulfillment is also not performed in real-time—there is generally a lag period between the redemption request and the issuance of e-coupons, e-gift certificates, etc.

SUMMARY OF THE INVENTION

Systems and methods for reward account processing using a distributed ledger are disclosed. In one embodiment, at one node of a plurality of nodes in a distributed ledger network for a plurality of reward program participants, the node comprising at least one computer processor, a method for reward account processing using a distributed ledger may include: (1) receiving a commitment of earned reward points for a customer account for a customer from one of the reward program participants; and (2) writing the earned reward points to the customer account on a copy of the distributed ledger maintained by the node. The earned reward points are available for redemption by the customer after they are written to the customer account.

In one embodiment, at least one of the reward program participants may be a good or service provider. In another embodiment, at least one of the reward program participants may be a financial institution.

In one embodiment, the earned reward points may be committed to the distributed ledger following a consensus by the plurality of nodes in the distributed ledger network.

In one embodiment, the earned rewards may be earned based on a transaction with one of the reward program participants.

In one embodiment, the method may further include communicating a reward point balance in the customer account to a computer program executed by an electronic device associated with the customer.

In one embodiment, the writing of the earned reward points may be immutable and cryptographically verifiable.

According to another embodiment, at one node of a plurality of nodes in a distributed ledger network for a plurality of reward program participants, the node comprising at least one computer processor, a method for reward account processing using a distributed ledger may include: (1) receiving a request to withdraw an amount of reward points from a customer account for a customer maintained by a distributed ledger; (2) retrieving, from the distributed ledger, a reward points balance for the customer account; (3) verifying that the reward points balance in the customer account is greater than the amount of reward points to be withdrawn; (4) writing a deduction of the amount of reward points from the reward points balance in the customer account to the distributed ledger; and (5) causing a financial instrument to be issued in response to the deduction.

In one embodiment, at least one of the reward program participants may be a good or service provider. In another embodiment, at least one of the reward program participants may be a financial institution.

In one embodiment, the deduction of the amount of reward points from the reward points balance in the customer account may occur following a consensus by the plurality of nodes in the distributed ledger network.

In one embodiment, the financial instrument may include an electronic gift card.

In one embodiment, the electronic gift card may be provided by a fulfillment provider.

In one embodiment, the request to withdraw the amount of reward points may be received from a computer program executed by an electronic device.

In one embodiment, the computer program may be a mobile application for one of the reward program participants.

In one embodiment, a smart contract may verify that the reward points balance in the customer account is greater than the amount of reward points to be withdrawn.

In one embodiment, the method may further include communicating a reward point balance in the customer account to a computer program executed by an electronic device associated with the customer.

In one embodiment, the writing of the deduction of the amount of reward points may be immutable and cryptographically verifiable.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for reward account processing using a distributed ledger.

Embodiments may provide the customer with the flexibility to bank or save loyalty/reward points for future use with a sponsoring financial institution. This may move the financial institution's current liability (or responsibility to honor the loyalty/reward points to the future.

In embodiments, access to a distributed ledger (e.g., a blockchain-based distributed ledger, an Ethereum-based distributed ledger, etc.) may be provided to good/service providers and fulfilment vendors participating in a rewards program. It may be provided as a real-time, or near real-time process, whereby the customer's reward points may be made available as soon as the good/service provider submits them to the distributed ledger. The customer may also redeem reward points in real-time, or in near real-time.

The likelihood of fraud may be eliminated or reduced as the transactions written to the distributed ledger may be immutable. In addition, the transactions may be secure, authenticated, and verifiable.

Embodiments may further reduce vendor/merchant onboarding time.

For example, a good/service provider (e.g., a hotel, airline, etc.) may add reward points to a customer account or wallet based on transactions (e.g., trips, stays, etc.) that may be maintained by the distributed ledger at each node. A financial institution may add reward points to the customer's account or wallet based on, for example, transactions conducted with a credit card issued by the financial institution, other reward-earning activities, etc.

The customer may request to redeem reward points for, for example, an electronic gift (e-gift) card. The customer may redeem reward points for other benefits (e.g., discounts, free merchandise, etc.) as is necessary and/or desired.

After the request is made, a fulfillment vendor may receive and process the request. In one embodiment, the fulfillment vendor may retrieve a current status (e.g., the number of points, whether the account is in good standing, etc.) of the customer's wallet or account. A smart contact may then execute rules to determine whether to approve or decline the customer request, and, if approved, the fulfilment vendor may then fulfill the request. The customer may receive the e-gift card, or other benefit, in near real-time.

Figure 1:
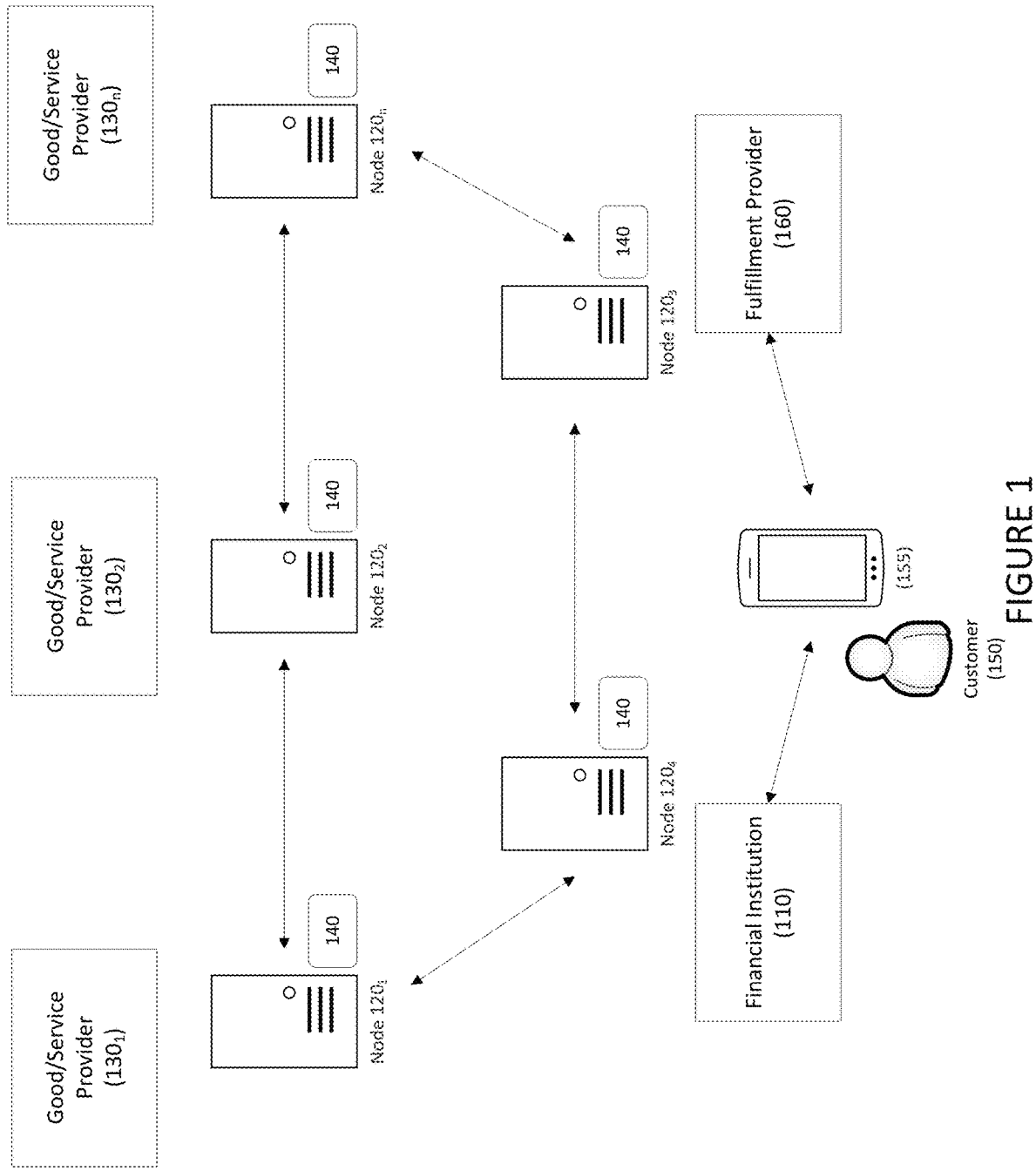
FIG. 1 depicts a system for reward account processing using a distributed ledger according to one embodiment.

Referring to FIG. 1, an exemplary system for reward account processing using a distributed ledger is disclosed according to one embodiment. System 100 may include a plurality of nodes 120, and each node 120 may be associated with a reward program participant 130, such as a good/service provider (e.g., a merchant, hotel, airline, etc.). In one embodiment, one of nodes 120 may be associated with financial institution 110.

In one embodiment, each node 120 may maintain a copy of distributed ledger 140.

In one embodiment, fulfillment provider 160 may be associated with one of nodes 120 and may fulfill customer requests for using a rewards account or wallet that may be maintained by copies of distributed ledgers 140. In one embodiment, fulfilment provider 160 may be part of, or associated with, financial institution 110, or it may be a separate entity.

In one embodiment, one or more smart contract may be provided on one or more copy of distributed ledger 140.

Customer 150 may access the customer's reward account or wallet using electronic device 155. Electronic device may be any suitable electronic device, including smartphones, smart watches, laptop computers, desktop computers, tablet computers, kiosks, automated teller machines (ATMs), Internet of Things (IoT) appliances, etc.

In one embodiment, customer 150 may use electronic device 155 to access the reward account or wallet via financial institution 110. In another embodiment, customer 150 may use electronic device 155 to access the reward account or wallet via fulfillment provider 160. In still another embodiment, customer 150 may use electronic device 155 to access the reward account or wallet via one of good/service providers 130.

Figure 2:
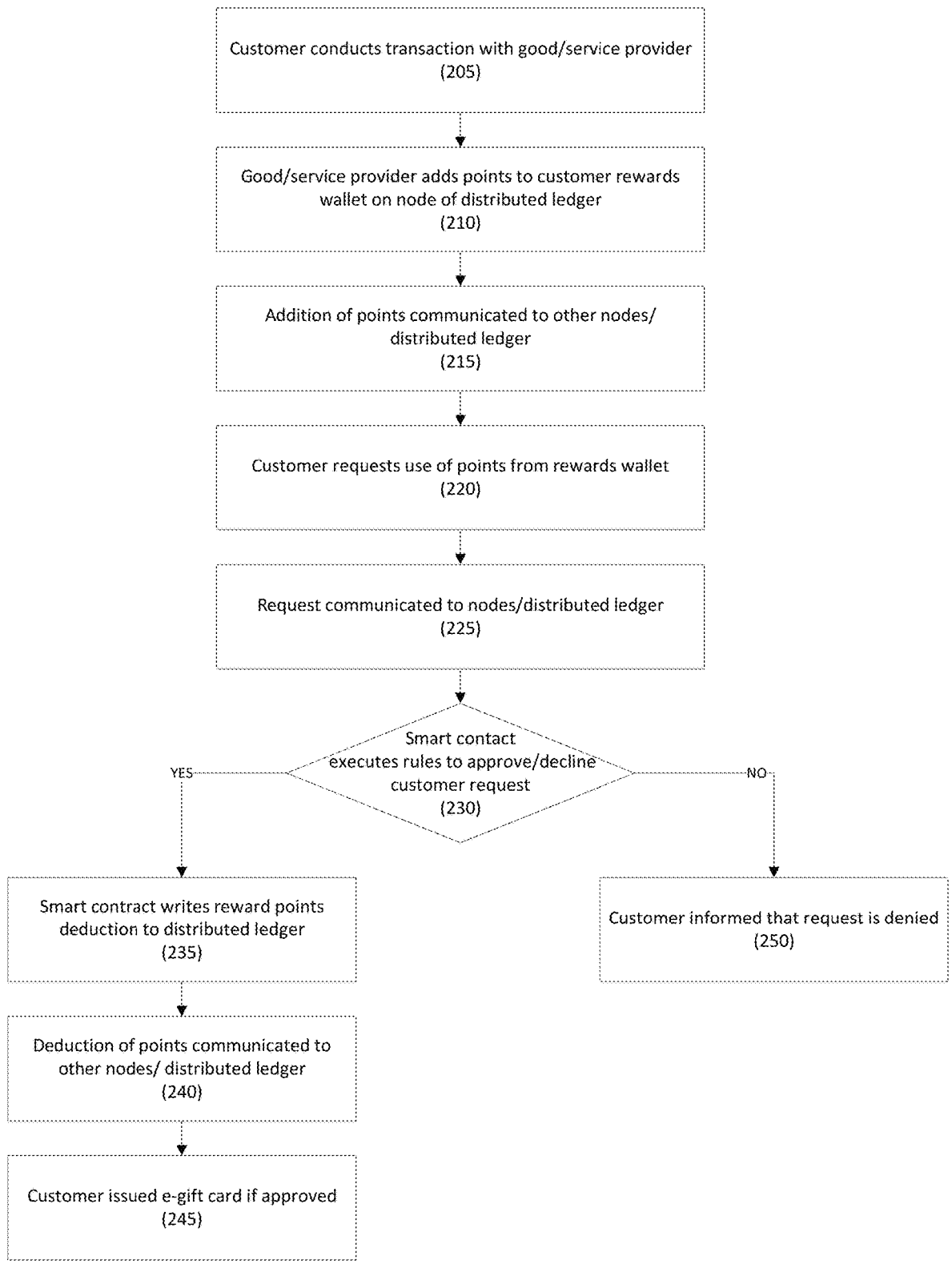
FIG. 2 depicts a method for reward account processing using a distributed ledger according to one embodiment.
Figure 3:
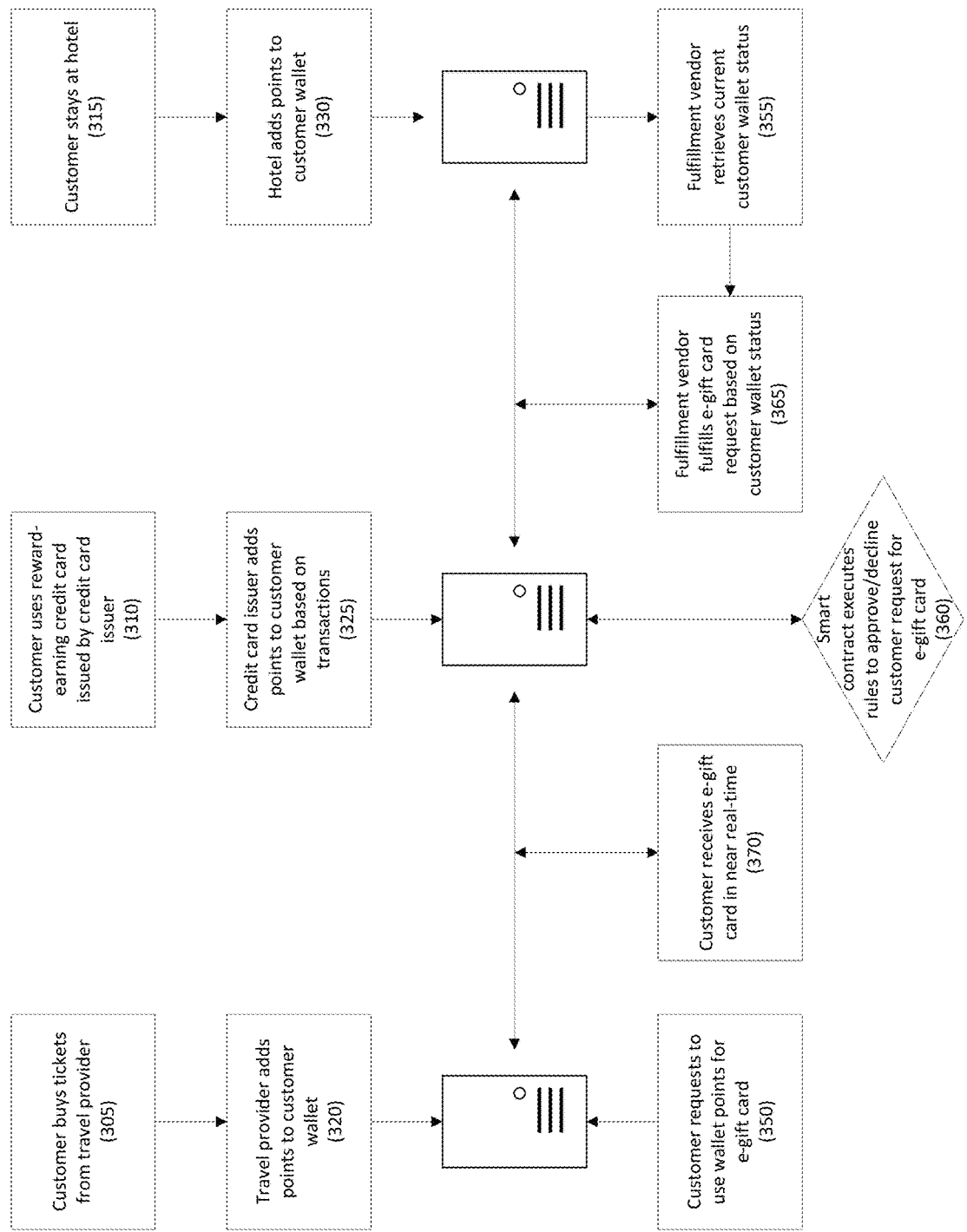
FIG. 3 depicts an exemplary use case according to one embodiment.

Referring to FIG. 2, an exemplary method for reward account processing using a distributed ledger is disclosed according to one embodiment.

In step 205, a customer may perform a rewards-earning activity with a reward program participant. Examples of such activities may include conducting a transaction using a financial instrument issued by a financial institution that may issue reward points when its financial instruments are used; conducting a transaction with a good/service provider (e.g., a hotel, rental car company, airline, etc.) that may issue the financial institution's reward points, etc.

In step 210, the good/service provider or the financial institution may commit reward points to the customer's rewards account or rewards wallet that may be maintained by a distributed ledger. In one embodiment, the rewards points may be submitted to a distributed ledger maintained by a node associated with the good/service provider or financial institution within a distributed ledger network, it may be submitted using a API, etc.

In step 215, the node that receives the submission of the reward points may communicate the addition to the other nodes for writing to each distributed ledger. In one embodiment, a consensus model may be used. The rewards points may be written in a manner that is cryptographically-verifiable and immutable.

In step 220, the customer may request a redemption of reward points from the customer's rewards wallet or rewards account. In one embodiment, the customer may use a mobile application or computer program (e.g., a browser) to request the redemption of the reward points. The request may be communicated to a node that may be associated with the consumer, the mobile application or computer program, the financial institution, or a good or service provider.

For example, the customer may redeem the reward points using a mobile application provided by the financial institution, or a computer program (e.g., a browser that access the financial institution's website), and the financial institution may submit the request to its copy of the distributed ledger.

In one embodiment, the customer may identify a number of reward points to redeem and/or a dollar value of the reward points. The customer may also specify a gift card merchant if more than one is available, or may specify a generic gift card.

In step 225, the request may be communicated to the other nodes, and in step 230, a smart contact may execute rules to approve or decline the customer request. For example, the smart contact may determine the number of points available to the customer, and may approve the request if the request is for fewer points that are available. If the request is for more points than are available, the request may be declined.

As another example, the request may be denied if there is less than an expected conscious approvals from participants, if there is double-spending of assets, etc.

If the request is approved, in step 235, the smart contract may submit the deduction of points to its copy of the distributed ledger. In step 240, the deduction of points may be communicated to the other nodes and distributed ledgers, and the customer's account or wallet may be updated to reflect the new balance.

In step 245, the smart contact may instruct a fulfilment vendor to issue the reward (e.g., an e-gift card) to the customer in near real-time. The issuance may be based on the customer's request.

If the smart contact declines the request, in step 250, the customer may be informed that the request is denied, and may be provided with a reason (e.g., too few points available). The customer may then modify the request for fewer points if desired.

Referring to FIG. 4, an exemplary use case is disclosed according to one embodiment. Applicant notes that this example is illustrative only.

First, a customer may take a reward-earning action, such as buying a ticket from a travel provider that participates in the reward program (305), using a reward-earning credit card issued by a bank (310), staying at a hotel that participates in the reward program (315), etc.

In response, the travel provider, the credit card issuer, or the hotel may add points to the customer's wallet by writing the points to a distributed ledger (320, 325, 330, respectively).

The customer may wish to redeem points in his or her wallet; thus, the customer may submit a request to redeem points for an electronic gift card (350).

A fulfillment vendor may retrieve the current wallet status (355), and a smart contract may execute rules to approve or deny the customer request (360). If approved, the fulfillment vendor may fulfill the e-gift card request (365). The e-gift card may be issued in near-real time (370).

Hereinafter, general aspects of implementation of the embodiments will be described.

Embodiments of the invention or portions of thereof may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for reward account processing using a distributed ledger comprising:

at one node of a plurality of nodes in a distributed ledger network for a plurality of reward program participants, wherein the one node is associated with a financial institution, the one node comprising at least one computer processor and a smart contract that executes thereon:

receiving a commitment of earned reward points for a customer account for a customer from one of the reward program participants, wherein the earned reward points are committed based on a use of a financial instrument associated with the financial institution, and wherein the earned reward points are associated with the financial institution; and writing the earned reward points to the customer account on a copy of the distributed ledger maintained by the one node;

wherein the earned reward points are available for redemption by the customer after they are written to the customer account;

receiving a request to withdraw an amount of reward points from the customer account;

retrieving, by the smart contract and from the distributed ledger, a reward points balance for the customer account;

comparing by the smart contract, the reward points balance in the customer account to the amount of reward points to be withdrawn;

determining, by the smart contract, that the amount of reward points to be withdrawn is less than the points balance;

approving, by the smart contract, the request;

writing a deduction of the amount of deducted reward points from the reward points balance in the customer account to the distributed ledger; and sending, by the smart contract and based on the approving the request and the deduction, an instruction to an issuing organization to issue a financial instrument to the customer.

2. The method of claim 1, wherein at least one of the reward program participants comprises a good or service provider.

3. The method of claim 1, wherein at least one of the reward program participants comprises a financial institution.

4. The method of claim 1, wherein the earned reward points are committed to the distributed ledger following a consensus by the plurality of nodes in the distributed ledger network.

5. The method of claim 1, wherein the earned rewards are earned based on a transaction with one of the reward program participants.

6. The method of claim 1, further comprising:
communicating a reward point balance in the customer account to a computer program executed by an electronic device associated with the customer.

7. The method of claim 1, wherein the writing of the earned reward points is immutable and cryptographically verifiable.

8. A method for reward account processing using a distributed ledger comprising:
at one node of a plurality of nodes in a distributed ledger network for a plurality of reward program participants, the one node comprising at least one computer processor and a smart contract executing thereon:
receiving a request to withdraw an amount of reward points from a customer account for a customer maintained by a distributed ledger;
retrieving, by the smart contract and from the distributed ledger, a reward points balance for the customer account, wherein the rewards points balance is based on a use of a financial instrument associated with a financial institution, and wherein the reward points balance is associated with the financial institution;

comparing, by the smart contract, the reward points balance in the customer account to the amount of reward points to be withdrawn;

determining, by the smart contract, that the amount of reward points to be withdrawn is less than the points balance;

approving, by the smart contract, the request;

writing a deduction of an amount of deducted reward points from the reward points balance in the customer account to the distributed ledger; and sending, by the smart contract and based on the approving the request and the deduction, an instruction to an issuing organization to issue a financial instrument to the customer.

9. The method of claim 8, wherein at least one of the reward program participants comprises a good or service provider.

10. The method of claim 8, wherein at least one of the reward program participants comprises a financial institution.

11. The method of claim 8, wherein the deduction of the amount of reward points from the reward points balance in the customer account follows a consensus by the plurality of nodes in the distributed ledger network.

12. The method of claim 8, wherein the financial instrument comprises an electronic gift card.

13. The method of claim 12, wherein the issuing organization is a fulfillment provider.

14. The method of claim 8, wherein the request to withdraw the amount of reward points is received from a computer program executed by an electronic device.

15. The method of claim 14, wherein the computer program is a mobile application for one of the reward program participants.

16. The method of claim 8, further comprising:
communicating a reward point balance in the customer account to a computer program executed by an electronic device associated with the customer.

17. The method of claim 8, wherein the writing of the deduction of the amount of reward points is immutable and cryptographically verifiable.

18. The method of claim 1, wherein the financial instrument comprises an electronic gift card.

19. The method of claim 18, wherein the issuing organization is a fulfillment provider.

* * * * *